Feb. 18, 1941.  R. R. CHAPPELL ET AL  2,232,589
TELEMETRIC DEVICE
Filed April 29, 1936   4 Sheets-Sheet 1

Fig. 1

INVENTORS.
Ralph R. Chappell
Rutger B. Colt
Robert J. Streb
BY Stephen Gerstvik
ATTORNEY.

Feb. 18, 1941.  R. R. CHAPPELL ET AL  2,232,589
TELEMETRIC DEVICE
Filed April 29, 1936  4 Sheets-Sheet 4

INVENTORS.
Ralph R. Chappell
Rutger B. Colt
Robert J. Streb
BY Stephen Gerstvik
ATTORNEY.

Patented Feb. 18, 1941

2,232,589

UNITED STATES PATENT OFFICE 2,232,589

TELEMETRIC DEVICE

Ralph R. Chappell, Richmond, Va., and Rutger B. Colt and Robert J. Streb, Baltimore, Md., assignors to Bendix Aviation Corporation, South Bend, Ind., a corporation of Delaware Application April 29, 1936, Serial No. 77,060

9 Claims. (Cl. 234—1.5)

This invention relates to signaling apparatus of the "distance recorder and indicator type," and more particularly to means for transmitting and receiving signals and converting the same into indications, either permanent or temporary, which are indicative of instantaneous values of a variable, such as, for example, a variable force, position, fluid pressure, temperature, etc.

One of the objects of the present invention is to provide novel means and methods for transmitting and recording and/or indicating variations in the value of a variable quantity, quality or condition.

Another object is to provide novel apparatus wherein a plurality of members which are movable cyclically in approximate synchronism by separate driving means may be automatically resynchronized for each cycle of operation.

Another object is to provide novel apparatus for producing indications at a control station of a variable at a remote station, wherein a circuit connecting the transmitting and receiving instruments is maintained closed during a time interval which constitutes a measure of an instantaneous value of the variable and wherein the energy in said circuit is employed for controlling an auxiliary circuit to produce momentary impulses of auxiliary energy to record said instantaneous values.

Another object is to provide novel apparatus for producing a permanent record on a recording surface whereby a curve of any range of values plotted on any desired scale may be produced on a comparatively narrow recording surface without the necessity for reversing the recording means each time the curve has traversed the recording surface and accordingly without changing the direction of the slope of the curve to indicate like changes in the plotted value.

A further object is to provide novel recording apparatus which is simple both in construction and operation, which may be readily and inexpensively manufactured, and which is rugged, yet accurate and reliable.

A still further object is to provide novel means, in a system for transmitting and recording values of a variable, such as the position of an element, wherein a measurable movement or time interval is representative of the value of the variable, for recording both the beginning and end of said movement or interval.

Another object is to provide an indicating instrument for a metering system embodying novel means for periodically positioning an indicator element.

Another object is to provide novel indicating apparatus wherein a rotatable indicating element is adapted to be intermittently positioned by means carried on a continuously rotating member and wherein means are also provided for totalizing the number of revolutions of said element.

The above and further objects and novel features of the invention will more fully appear from the following detail description when taken in connection with the accompanying drawings. It is to be expressly understood, however, that the drawings are for the purpose of illustration only and are not designed as a definition of the limits of the invention, reference being had for this latter purpose to the appended claims.

In the drawings, wherein like reference characters refer to like parts throughout the several views.

The present invention comprehends novel means which are particularly adapted for use in combination to form a novel system for producing an exhibit at a control station corresponding to the value of some measurable quantity or condition transmitted over the system from a remote station. Said system, as herein described, comprises two instruments or units which are operated cyclically in synchronism so that a measurable portion of each cycle, as determined by the sending unit in cooperation with suitable indicating means, is representative of the value of the variable to be transmitted, said representative portion of the cycle being translated at the receiving instrument into a readable indication of said value. The units are electrically connected and so constructed that a circuit is energized during said measured or representative portion of each cycle and the energy in said circuit is employed to control the production of impulses of auxiliary energy to actuate or control the recording or indicating mechanism of the receiver unit. A system and apparatus applicable for indicating, transmitting and recording variable water stages or other liquid levels has been chosen, by way of example, for the purposes of describing and illustrating one useful form of the invention.

Figure 1:
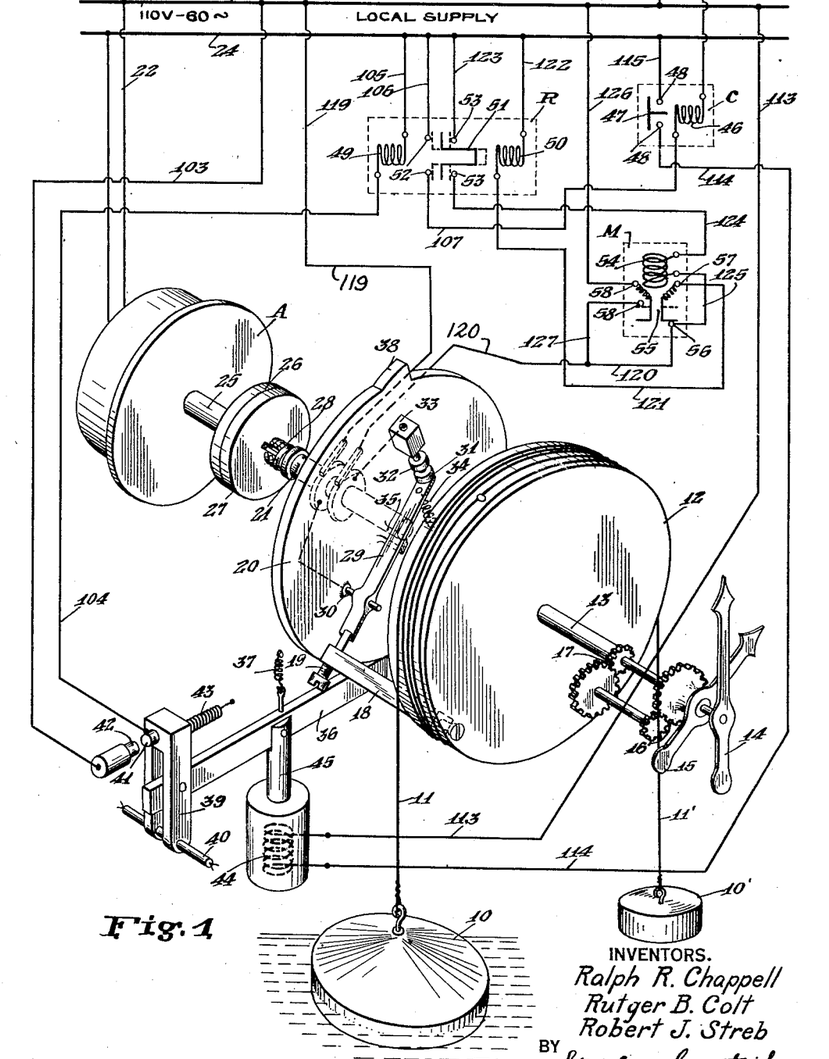
Fig. 1 is a diagrammatic illustration of one form of transmitter which may be employed in carrying out the present invention.

Referring now to the drawings, and more particularly to Fig. 1, wherein the transmitting or sending unit is shown, the means for measuring the variable, i. e. the water level, comprises a float 10, adapted to be supported by a liquid body, and connected by means of a flexible cord or cable 11 to a drum 12 which is mounted on a shaft 13 for rotation therewith and around which the cable is wound. Any suitable means such as a coil spring or the usual counterweight 10' suspended from drum 12 by cable 11' may be provided for rotating drum 12 in a clockwise direction, as viewed in the drawings, to take up the slack in line 11 when the float is raised by the liquid. If a readable indication of the water level is desired at the sending station, a hand 14 may be secured to shaft 13 and operated thereby over a suitable graduated dial (not shown). Another hand 15 may be loosely mounted on shaft 13 and drivably connected thereto by reduction gear train 16, 17 whereby a complete revolution of drum 12 will produce only a partial revolution of hand 15. The latter hand thus serves as a counter or totalizer for the revolutions of hand 14. Secured to drum 12, preferably adjacent the periphery thereof and extending axially therefrom, is an arm 18. A set screw 19 is threaded through the outer end of said arm for a purpose to appear hereafter. It will, of course, be understood that practically any variable indicating instrument, such as a speed or temperature indicator, may be substituted for the water stage indicator above described.

Novel means are provided for periodically ascertaining the position of drum 12 or hand 14 with respect to a predetermined reference position in terms of a measurable time interval or distance. As shown, said means comprise a disc 20 mounted on a shaft 21 for rotation therewith relative to drum 12, said shaft preferably being coaxial with shaft 13. Disc 20 is adapted to be driven at a constant or uniform speed when in motion by any suitable driving means such as, for example, a synchronous electric motor A which is electrically connected by leads 22 to a local supply of alternating current energy represented by conductors or busses 23 and 24.

A yielding driving connection is interposed between shaft 25 of the driving means and shaft 21, which, in the form illustrated, is constituted by a friction clutch comprising a pair of plates 26 and 27. The former plate is rigidly secured to shaft 25 whereas the latter is mounted on shaft 21 for rotation therewith and longitudinal movement relative thereto. Suitable resilient means, such as a coil spring 28, may be provided for continually pressing plate 27 into frictional driving engagement with plate 26.

Electric contact mechanism adapted to cooperate with an element, such as arm 18, the position of which is indicative of the value of the variable to be recorded or indicated, is mounted on and movable with disc 20. Said mechanism preferably comprises a lever 29 pivotally mounted intermediate its ends on a pin 30 extending axially from disc 20. A contact 31 is mounted on and insulated from the inner end of said lever and is adapted to be moved into engagement with a contact 32. The latter is slidably mounted in a guide 33 carried by disc 20 and is normally held in the position of Fig. 1 by suitable resilient means enclosed in said guide. The outer end of lever 29 is adapted to engage the inner end of screw 19 when disc 20 reaches an angular position with respect to a predetermined reference position which bears a known relation to the instantaneous position of drum 12. Upon continued relative rotation of said disc and drum, the former moving in the direction of the arrow, lever 29 is caused to pivot about pin 30 and move contacts 31 and 32 into engagement. Contact 32 yields to the pressure exerted thereon until the outer end of lever 29 passes over screw 19, whereupon the lever is returned by suitable resilient means 34 to the position of Fig. 1 against a stop 35.

For the purpose of checking the synchronization and, if necessary, to resynchronize disc 20 with the receiver instrument to be hereinafter described, novel combined braking and circuit control means are provided whereby the synchronously movable elements of both the transmitter and receiver instruments are constrained to move simultaneously from predetermined reference positions at the beginning of each cycle of operation. Preferably, such means comprise a brake arm 36, the free end of which is normally held adjacent the periphery of disc 20 by a spring 37 and is adapted to be engaged by the flat, radial surface of a lug 38 on said disc. The other end of arm 36 is pivotally secured to a bifurcated member 39 which is in turn pivotally mounted on a fixed pivot pin 40. An electrical contact 41, mounted on but insulated from member 39, is adapted to be moved into engagement with a fixed contact 42 by pressure exerted against the free end of brake arm 36. A spring 43 holds said contacts in normal open position as illustrated but yields to permit closing of said contacts when lug 38 engages the end of said brake arm. When the contacts are thus engaged, disc 20 will be held against further rotation and slippage will occur between plates 26 and 27 until a similar condition exists at the receiving instrument, whereupon a circuit will be closed containing the coil 44 of a pivotally mounted solenoid, the core 45 of which is pivotally connected to the central portion of brake arm 36. When energized, solenoid 44, 45 is effective to pull arm 36 downwardly against the efforts of spring 37 to thereby release the pressure of disc 20 against brake arm 26 and thereby permitting spring 43 to open contacts 41 and 42.

The additional electrical equipment which completes the transmitting instrument, the circuit connections for which will appear hereinafter in the description of the operation of the complete system, comprises a solenoid operated switch C constituted by a coil 46 and a plunger 47, the latter being adapted to bridge a pair of contacts 48, 48 when the coil is energized. A "mechanical latch" relay R has two coils 49 and 50 each adapted, when energized, to actuate a common plunger 51 to bridge either the pair of contacts 52, 52 or the pair 53, 53. When moved by coil 49 to bridge contacts 52, plunger 51 will be mechanically held in that position irrespective of the deenergization of said coil until again attracted by coil 50 to a position for bridging contacts 53. Likewise, the plunger will be mechanically held in said latter position until the same is again attracted by coil 49. Since the mechanical latching means for plunger 51 may be of any well-known construction, the same is not shown in the drawings. A midget relay M is also provided and comprises a coil 54 and a plunger 55 which is normally held by suitable resilient means (not shown) in position to connect terminals 56, 57. When attracted by coil 54, plunger 55 is moved to a position for connecting terminals 56, 58.

Figure 2:
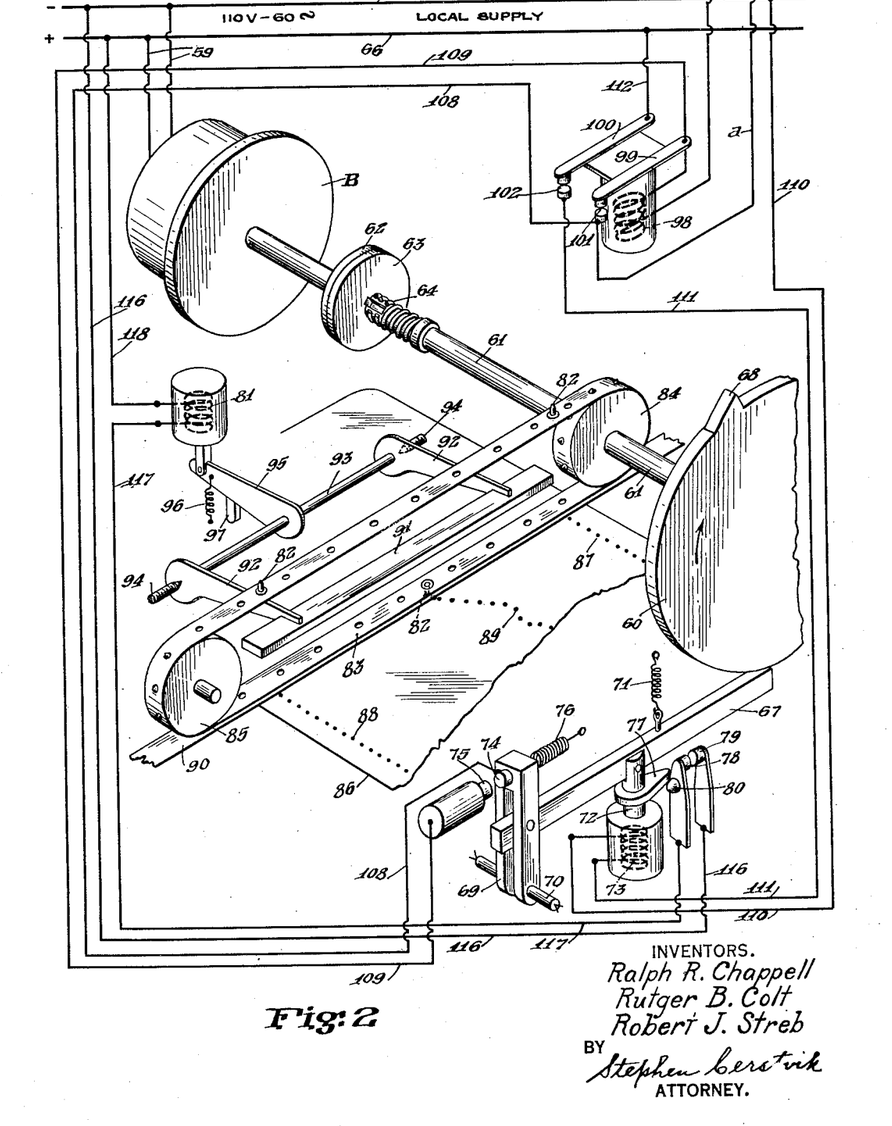
Fig. 2 is a diagrammatic illustration of one form of receiving and recording mechanism which may be employed.

Turning now to the novel receiving and recording instrument diagrammatically illustrated in Fig. 2 and installed at a control station, a disc 60 mounted on a shaft 61 is adapted to be driven in synchronism with disc 20 and preferably at a uniform speed by any suitable driving means, such as a synchronous electric motor B, through a yieldable clutch 62, 63 similar to clutch 26, 27. Plate 63 is loosely splined to shaft 61 and held in frictional engagement with plate 62 by a spring 64. Motor B is electrically connected by leads 59, 59 to a local source of alternating current supply, such as lines 65 and 66, having the same characteristics as to voltage and frequency as the local source of supply 23, 24 at the sending station. It will, of course, be understood that motors A and B may be of the synchronous type and attached to the same source of supply, if such a source is available at both stations, or that any other suitable type of driving means that may be operated in synchronism may be employed.

Braking means for disc 60 and associated circuit control means substantially the same as the corresponding means at the sending instrument are provided and, as shown, comprise a braking arm 67 adapted to cooperate with a lug 68 on said disc, said arm being pivotally supported at one end by a bifurcated member 69 which is in turn mounted on a fixed pivot 70. Arm 67 is normally held by spring 71 with the free end thereof adjacent disc 60, and the core 72 of a solenoid 73 is connected to the central portion of the arm for the purpose of pulling said free end downwardly against the efforts of spring 71 to release disc 60. A contact 74 mounted on member 69 is normally held out of engagement with a cooperating fixed contact 75 by a spring 76, but is adapted to be moved into engagement when lug 68 engages arm 67.

Solenoid 72, 73, in addition to actuating arm 67, is effective through a collar 77 on core 72 to move a pair of spring mounted contacts 78 and 79 into engagement with one another. Preferably, collar 77 engages and passes a bead 80 on the arm of contact 78, both on its down stroke and on its up stroke, to produce two momentary impulses of energy in a local circuit including a solenoid 81.

Novel recording means are provided as part of the receiving instrument, which means are so constructed that a continuous record of the values of a variable at a local or remote station may be made on a comparatively narrow record surface without reversing the operation of any of the movable parts at any time. An easily readable record of any range of values may also be produced, the entire record curve being readable from a common base line and having the same direction of slope throughout with respect to said base line for like changes in the variable value being recorded. In the embodiment of Fig. 2, the recorder is constituted by a plurality of styles or markers 82 carried by an endless belt or tape 83. The latter is mounted on and adapted to be driven by a pair of pulleys 84 and 85 to successively move each of the markers 82 across a recording surface 86 from right to left as viewed in the drawings. Markers 82 are spaced on belt 83 so that at least one will be over the recording surface at all times, the same preferably being spaced apart a distance somewhat less than the width of the recording surface 86.

In order that markers 82 may be successively moved from a reference position a distance representative of the liquid level or other variable at a given instant at the sending station, pulley 84 is mounted on shaft 61 for rotation therewith so that marking pins 82 will move in synchronism with discs 20 and 60. During each revolution of disc 60 or pulley 84, one marker is moved across the recording surface from base line 87 to an upper margin line 88. The distance between said lines is also the distance at which pins 82 are spaced on belt 83 and the latter is so positioned on pulley 84 that one marker is stopped over base line 87 and one over line 88 when discs 20 and 60 are stopped in their reference positions by brake arms 36 and 67. Since one of the markers moves across the record surface from base line 87 in synchronism with disc 20 of the sender, it will be apparent that the distance said marker has moved from the base line at the instant the position of disc 20 corresponds to the position of drum 12 will be indicative of the liquid level being measured.

It will be noted that each marker 82 makes every third record mark when three markers are used, except that when the value of the variable increases so that the curve extends beyond margin line 88 a new curve is started adjacent base line 87 by the succeeding marker pin. If desired, the distance between lines 87 and 88 may, be properly proportioning the parts, be made to represent a change in water level indicated by one complete revolution of indicator hand 14. Then, the number of traverses of the curve across sheet 86 will represent the position of counter hand 15. Record surface 86 may be moved along at right angles to tape 83 by any suitable means, such as a clock mechanism (not shown), so that the abscissa of the curve 89 will represent time while the ordinates will represent the values of the variable.

Markers 82 may be constructed to prick or mark surface 86 in any suitable manner, and in the form illustrated, novel marking means including an inked ribbon 90, interposed between belt 83 and surface 86, are provided. A tapping mechanism for moving markers 82 into contact with the ribbon to thereby mark the desired record on surface 86 comprises a flat member 91 which is supported over the lower section of belt 83 by a pair of arms 92 that are angularly movable with a rod 93. Said arms and rod are mounted on pivot members 94 and are adapted to be angularly reciprocated by an arm 95 which is secured to rod 93 and pivotally connected to the reciprocable plunger of solenoid 81. A suitable spring 96 is provided for normally holding the tapping mechanism in the illustrated position against a stop 97.

The electrical equipment at the receiving instrument includes, in addition to the parts already described, a solenoid operated switch mechanism which comprises a coil 98 adapted to simultaneously actuate a pair of contact strips 99 and 100 to close two pairs of contacts 101 and 102 which are normally held in open position by any suitable means such as the resiliency of strips 99, 100.

In the operation of the system, motors A and B are continuously energized and tend to continuously and synchronously drive discs 20 and 60 through friction clutches 26, 27 and 62, 63 in a clockwise direction as viewed in the drawings. When lug 38 of disc 20 engages brake arm 36, contacts 41, 42 are moved into engagement, closing a circuit from supply line 23 through lead 103, contacts 41 and 42, lead 104, coil 49, and lead 105 back to supply line 24. Coil 49 being thus energized attracts plunger 51 to bridge contacts 52. A circuit connecting the sending and receiving instruments is thus closed, provided disc 60 of the latter instrument has also reached its braked or reference position and moved contacts 74, 75 into engagement. The latter circuit comprises bus 24, lead 106, contacts 52, lead 107, coil 46, lead a, which extends to the receiving instrument, one of the contacts of pair 101, lead 108, contacts 74, 75, lead 109, coil 98, and lead b, which returns to bus 23 at the sending instrument. The energization of coils 46 and 98 causes local circuits to the brake releasing solenoids 44 and 73, respectively, to be completed, the circuit to the latter comprising lead 110, coil 73, lead 111, contacts 102, strip 100 and lead 112, and the circuit to the former comprising lead 113, coil 44, lead 114, contacts 48 and lead 115. Coil 98 also closes contacts 101 so that the circuit between the sender and receiver is maintained through lead a, contacts 101, conducting strip 99, coil 98 and lead b after contacts 74, 75 are disengaged.

It will thus be seen that discs 20 and 60 are periodically and simultaneously started from a predetermined reference position, thereby insuring resynchronization of the movement thereof and of the movement of markers 82 during each cycle of operation. Circuit connections between the two instruments are provided even after the discs are released. With disc 60 in its reference position, one of the markers 82, as pointed out above, will be positioned over base line 87 and another over margin line 88. The downward or brake releasing movement of plunger 72 when attracted by coil 73 causes collar 77 to engage bead 80 and momentarily close contacts 78, 79 to close a local or auxiliary circuit which includes lead 116, contacts 79, 78, lead 117, the coil of solenoid 81, and lead 118. Solenoid 81 is thus energized to attract its plunger and cause the tapping mechanism 91, 92 to strike the markers 82. A base line dot which serves as a visual check on the synchronization of the parts is thus made at the beginning of each cycle.

The circuit through leads a and b connecting the sending and receiving instruments is maintained closed during the time interval that is required for disc 20 to move from its reference position to a position corresponding to the instant position of drum 12 which is in turn indicative of the variable being measured. When the latter condition is reached, contacts 31, 32 will be closed by the cooperation of screw 19 and lever 29 in the manner above pointed out. A circuit is thereby closed through lead 119, contacts 32, 31, lead 120, terminals 56, 57, lead 121, coil 50 and lead 122, causing plunger 51 to be attracted and bridge contacts 53. By the same action, the holding circuit through leads a and b is broken at contacts 52 and coils 46 and 38 deenergized, thereby permitting the circuits through coils 44 and 73 to be opened at contacts 48 and 102, respectively.

Upon the deenergization of coil 73, plunger 72 is pulled upwardly by spring 71 and through the cooperation of collar 77 and bead 80 momentarily closes the auxiliary circuit to solenoid 81. The impulse of energy through solenoid 81 causes the latter to again actuate the tapping mechanism to make a dot on surface 86 as a continuation of curve 89 at a distance from base line 87 proportional to the instant value of the water level or other variable on some pre-selected scale.

For the purpose of preventing sparking between contacts 31, 32 and to insure the deenergization of coil 50 for the succeeding cycle of operation, midget relay M is energized to break the circuit including said coil at terminal 56 and close an additional circuit for diverting current from said contacts. The energization of relay M takes place through a circuit including lead 123, contacts 53, lead 124, coil 54, leads 125, 120, contacts 31, 32 and lead 119. When solenoid 55 has been moved by coil 54 into contact with terminal 58, a circuit is closed including lead 126, terminals 59, leads 127, 120, terminal 56, lead 125, coil 54, lead 124, contacts 53 as plunger 51 remains in contact with 53 even after coil 50 is de-energized, and lead 123.

After the value of the variable has thus been recorded, the parts remain in their last-described position until discs 20 and 60 again reach their reference positions and the cycle is repeated. At the beginning of the succeeding cycle, it will be noted that the circuit through coil 54 will be broken at contacts 53 as soon as coil 49 is energized.

Figure 3:
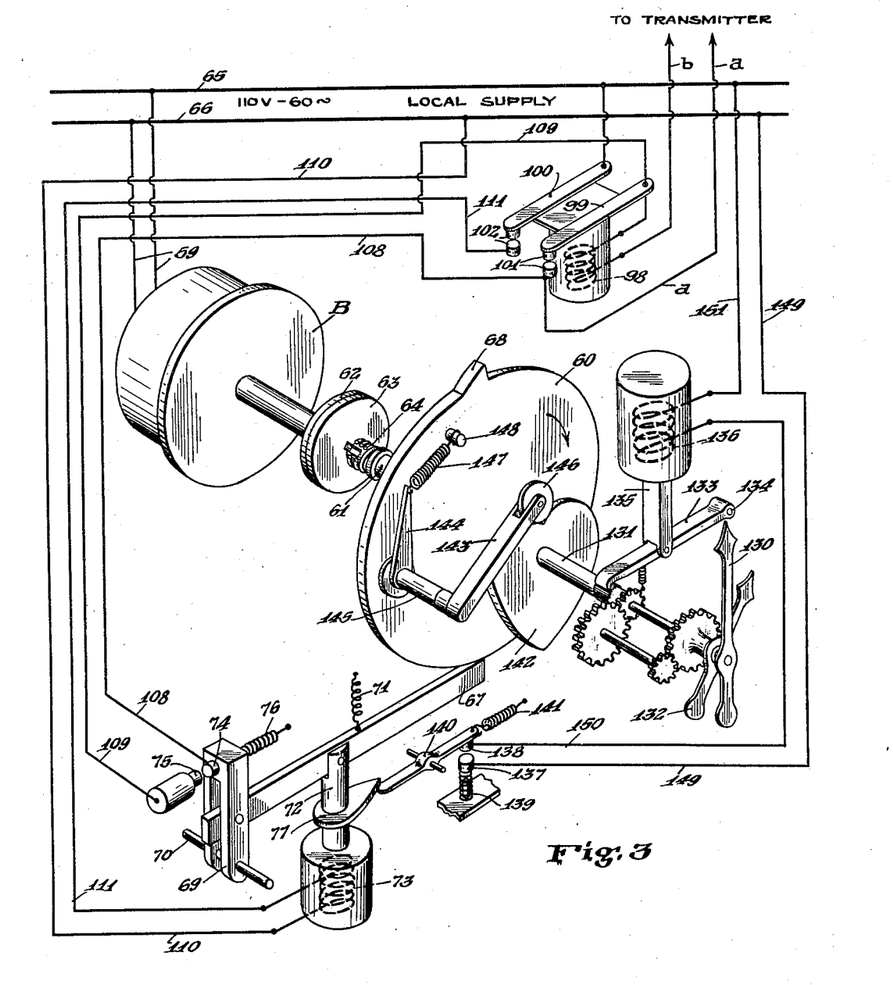
Fig. 3 is a similar view of another type of receiving indicator comprehended by the invention.

If desired, novel visual indicating means may be provided at the control or receiving station in lieu of or in combination with the recording means of Fig. 2, and one form of such means, as illustrated in Fig. 3, comprises a hand 130 mounted on a shaft 131 coaxial with shaft 61. A counter hand 132 may also be loosely mounted on shaft 61 and connected thereto by suitable reduction gearing in the same manner as hand 15 on shaft 13. A brake arm 133, pivotally mounted at 134 and adapted to be actuated by plunger 135 of solenoid 136, engages shaft 131 to normally hold the same against rotation in either direction. Brake actuating solenoid 135, 136 may be energized through a pair of contacts 137 and 138, one of which is cushion mounted on and insulated from a coil spring 139 and the other on one end of a pivoted lever 140, the other end of which is engageable by collar 77. Said contacts are normally held in disengaged position by spring 141.

Novel means for positioning hands 130 and 132 during each cycle of operation of the instrument to cause said hands to indicate an instantaneous position of the water level at the sending station includes a heart-shaped cam 142 mounted on shaft 131 adjacent disc 60. A crank comprising a pair of arms 143 and 144 rigidly secured to one another by a hollow shaft 145, the latter of which is rotatably mounted on a support projecting from disc 60, is interposed between said disc and cam. Arm 143 has a roller 146 mounted in the bifurcated outer end thereof which is held in engagement with the peripheral surface of cam 142 by a tension spring 147 connecting the free end of arm 144 with a pin 148 on disc 60.

At the beginning of the cycle of operation, coil 73 is energized in a manner heretofore fully described, and collar 77 is moved thereby to a point below the end of lever 140. When disc 60, operating in synchronism with disc 20, reaches a position in each cycle corresponding to the position of drum 12, coil 73 is deenergized in the manner above described and, on upward movement of collar 77, lever 140 is pivoted thereby to cause contacts 137 and 138 to engage. A local auxiliary circuit is thus closed which includes lead 149, contacts 137, 138, lead 150, solenoid 136, and lead 151. Solenoid 136 being thus energized lifts brake lever 133 and leaves shaft 131 free to rotate under the influence of crank 143 acting against cam 142, the latter being so formed, i. e. heart-shaped, that roller 146 will seek the groove in the periphery thereof when shaft 131 is released. Hands 130 and 132 will thus be periodically moved to a position for indicating the value of the variable at the instant the position of disc 20 corresponds to the position of drum 12.

Figures 4, 5:
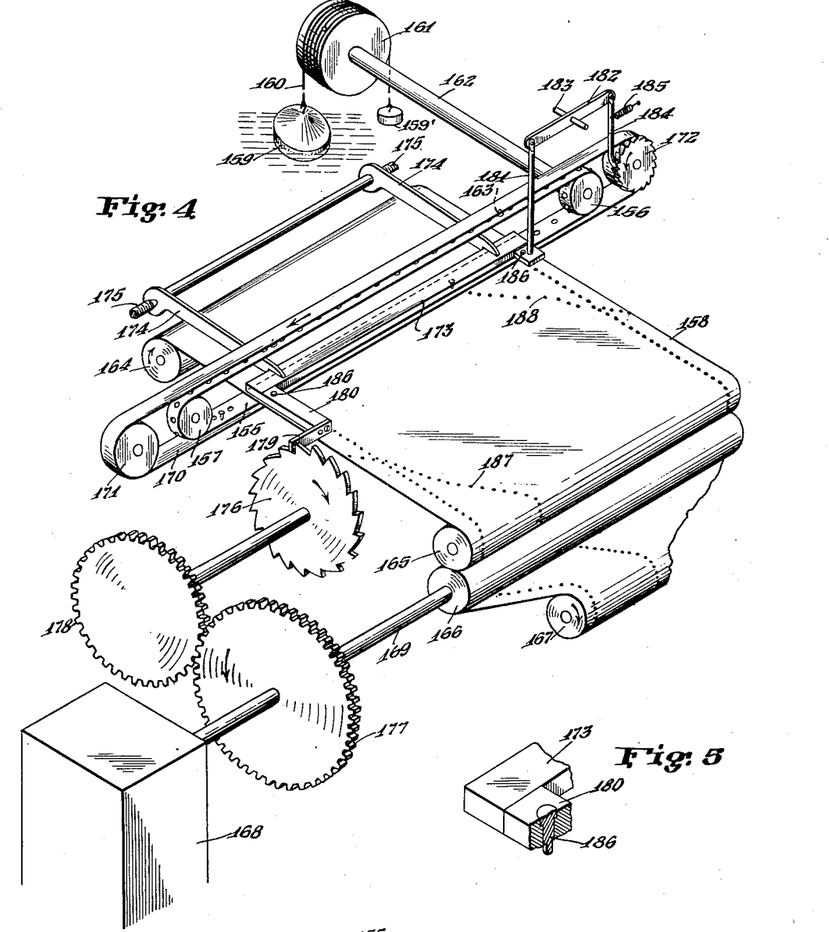
Fig. 4 is a diagrammatic view of another embodiment of the novel recording apparatus.
Fig. 5 is an enlarged detail view, partly in section and with parts broken away, of a part of the marking mechanism of the apparatus of Fig. 4; and, Fig. 6 is an enlarged detail view of a portion of the marking mechanism of Fig. 4.
Figure 6:
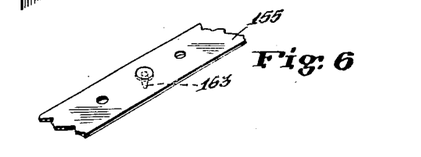

Another embodiment of the novel recording means is illustrated in Fig. 4 in a form adapted for use without a transmitter. As shown, an endless belt 155, mounted on pulleys 156 and 157, is moved over a recording surface 158 by means of a float 159 connected by a cord 160 to drum 161 which is in turn connected to pulley 156 by a rotatably mounted shaft 162. To take up slack in line 160, a counterweight 159' or other suitable means may be provided for rotating drum 161 in a clockwise direction. A plurality of marking elements 163 (Fig. 6), carried by belt 155 and preferably spaced apart thereon a distance not greater than the width of recording surface 158, are thus moved one at a time across the recording surface whenever float 159 rises or falls in response to a change in a liquid level determined by float 159, The recording surface is preferably in the form of a paper tape originating on a supply roller 164. Said tape passes under belt 155, over an idler roller 165, over a driving roller 166 and onto a take-up roller 167. Tape 158 is preferably moved at right angles to belt 155 by any suitable driving means 168, such as an escapement mechanism or constant speed motor, which is connected to driving roller 166 by means of a shaft 169.

Marking elements 163 may be constructed, as in the illustrated embodiment, constituting novel means employing the principles of a typewriter for marking the record, thereby avoiding the use of loose ink. As shown, an endless inked ribbon 170 is mounted on a pair of spaced rollers 171 and 172, the lower section thereof passing between belt 155 and recording surface 158. In order to produce a periodic indication or record of the position of float 159, a tapper bar 173 is supported by arms 174 and pivots 175 over the lower section of belt 155, and means operated in coordination with the moving surface 158 are provided for raising said bar and permitting the same to drop and strike marking elements 163. The latter means comprise a ratchet wheel 176 driven by motor 168 through gears 177 and 178 and adapted to cooperate with a blade 179 secured to an arm 180 on bar 173. The rotation of ratchet wheel 176 coacts with blade 179 to periodically raise bar 173 and permit the same to drop against marking elements 163. Said elements strike ribbon 170 and press the same against surface 158 to produce the desired indication.

Ribbon 170 may be shifted by the reciprocating action of bar 173, if desired, through a linkage and ratchet mechanism consisting of a link 181 engaging said bar, a lever 182 mounted on a fixed pivot 183, and a pawl 184 which is held in engagement with ratchet teeth on roller 172 by a spring 185.

If it is desired to mark reference lines adjacent the margin of surface 158 for the purpose of defining the recording range, marking elements 186 may be provided on the tapping mechanism in a position to engage ribbon 170 without interfering with the operation of belt 155. Markers 163 are preferably spaced apart a distance equal to the distance between the reference lines thus made so that when the variable increases to a point where one curve 187 extends beyond the recording range of surface 158, the next adjacent marker will start a new curve 188.

There is thus provided novel apparatus for transmitting, recording and indicating values of a variable which may be constructed of a small number of rugged, compactly arranged parts and which is accurate and reliable. A novel transmitting system is also provided wherein only two connecting leads between the sending and receiving stations are required and wherein the indications at the receiving station are not subject to error by reason of customary electrical disturbances in long transmission lines. In addition, novel recording means are provided whereby a more readily readable record may be produced on a comparatively narrow, linearly-movable recording surface.

Although only a limited number of embodiments of the invention have been illustrated and described, it is to be expressly understood that the same is not limited thereto but that changes may be made in the various mechanical details, designs and arrangement of parts illustrated without departing from the spirit and scope of the invention. For a definition of the limits of the invention, reference will be had primarily to the appended claims.

What is claimed is:

1. In apparatus of the class described, a movable element, a sender comprising contact mechanism adapted to cooperate with said element, driving means for said contact mechanism and means for braking said mechanism in a predetermined reference position, a receiver instrument comprising a marker, means for moving said marker over a recording surface and braking means for stopping said marker in a predetermined reference position, means for simultaneously releasing said braking means, and means operative when said contact mechanism engages said element to cause said marker to mark the record surface to produce a record indicative of the position of said element.

2. In apparatus of the class described, a sender, a receiver, and a circuit connecting the sender and receiver, said sender comprising two relatively movable members, one of which is movable from a reference position at approximately regular intervals of time, said receiver comprising a member movable from a reference position simultaneously and in approximate synchronism with said first-named regularly movable member, means operative when said regularly movable members are in their reference positions to close said circuit, means for opening said circuit when said regularly movable members have moved a distance proportional to the instantaneous value of a physical quantity, means controlled by electric energy in said circuit for producing an impulse of auxiliary energy, and means actuated by said impulse of auxiliary energy to record said instantaneous value of the physical quantity.

3. A telemetric system for obtaining at a control station an exhibit of the values of a physical quantity at a remote station including in combination an element movable in response to variations in said quantity at the remote station, a rotatable member at the remote station movable relatively to said element, a rotatable member at the control station, means mutually coacting for rotatably driving said members through complete revolutions in approximate synchronism with one another, yielding driving connections between said means and members, means for holding said members in predetermined reference positions against the efforts of said yielding connections, means effective upon synchronism of said members for releasing said holding means, and means at the control station rendered operative by coaction of the element and the rotatable member at the remote station at a point in the cycle determined by the position of the element for producing an exhibition of the value of the physical quantity for each rotation of said members.

4. A telemetric system for obtaining at a control station an exhibit of the values of a variable physical quantity at a remote station including in combination an element movable in response to variations in said quantity at the remote station, a rotatable member at the remote station movable relatively to said element, a rotatable member at the control station, means for stopping said members in predetermined reference positions, means effective upon synchronism of said members for simultaneously starting said members from said reference positions and moving the same continuously in approximate synchronism through a complete revolution, and means at the control station rendered operative at a predetermined time during the relative movement of said element and member by coaction of the element and the rotatable member at the remote station at a point in the cycle determined by the position of the element for producing an exhibition of the value of the physical quantity for each rotation of said members.

5. In apparatus for recording the values of a physical quantity, a sender, a remote receiver, and a circuit connecting the sender and receiver, said sender comprising two relatively movable members, one of which is movable from a reference position at approximately regular intervals, the other of said movable members being moved in accordance with variations in said physical quantity, said receiver comprising a member movable from a reference position simultaneously and in approximate synchronism with said first-named regularly movable member, an endless belt movable with said second-named regularly movable member in one direction only, a marker carried by said belt, a recording surface cooperating with said marker, and means controlled by the two first-named relatively movable members of the sender for actuating the marker when the one of said two first-named members has moved a distance proportional to the instantaneous value of a physical quantity to mark the record surface for producing a record of said instantaneous value of the physical quantity.

6. In apparatus for recording the values of a variable physical quantity, means responsive to variations in said physical quantity, a recording surface, means for moving said surface, an endless flexible carrier member, a continuously operating motor for moving said carrier member in one direction only and at right angles to the direction of movement of said surface, a frictional driving connection between said motor and said carrier member, a marking element on said carrier member, braking means for stopping said carrier member when said marking element reaches a predetermined position, means for releasing said braking means, means for tapping said element to produce a mark on said recording surface at the instant that said carrier member is stopped, and means controlled by said variation responsive means for tapping said marking element to produce another mark on said recording surface when said marking element has moved a distance proportional to the value of said physical quantity.

7. Telemetering apparatus for recording over a distance the value of a variable physical quantity, comprising a transmitter including a first rotatable element driven at constant speed in one direction only, a second rotatable element rotated to various positions in accordance with the variations in the physical quantity, means for rotating said first rotatable element at constant speed, a remote receiver electrically connected to said transmitter and including a marking device adapted to travel over a recording surface in one direction only, means for moving said marking device over said recording surface at constant speed, means for periodically stopping said marking device and the first rotatable element of the transmitter, means for actuating said stopping means to non-stopping position to simultaneously release said marking device and first rotatable element, whereby said marking device and said first rotatable element move simultaneously at constant speed and in synchronism with each other from their stopped positions, and means controlled by the first and second rotatable elements of the transmitter for actuating said marking device when said first rotatable element has moved from its stopped position a distance proportional to the value of the physical quantity as determined by the then position of the second rotatable element of the transmitter, whereby a record is produced on said recording surface representative of the values of said physical quantity.

8. Telemetering apparatus for recording over a distance the value of a variable physical quantity, comprising a transmitter including a first rotatable element driven at constant speed in one direction only, a second rotatable element rotated to various positions in accordance with the variations in the physical quantity, means for rotating said first rotatable element at constant speed, a remote receiver electrically connected to said transmitter and including a marking device adapted to travel over a recording surface in one direction only, means for moving said marking device over said recording surface at constant speed, means for periodically stopping said marking device and the first rotatable element of the transmitter, means for actuating said stopping means to non-stopping position to simultaneously release said marking device and first rotatable element, whereby said marking device and said first rotatable element move simultaneously at constant speed and in synchronism with each other from their stopped positions, and means controlled by the first and second rotatable elements of the transmitter for actuating said marking device when said first rotatable element has moved from its stopped position a distance proportional to the value of the physical quantity as determined by the then position of the second rotatable element of the transmitter, whereby a record is produced on said recording surface representative of the values of said physical quantity, and means controlled by said stopping means for also actuating said marking device to produce another record on said record sheet to serve as a base line against which the first-mentioned record is measured.

9. Telemetering apparatus for recording over a distance the value of a variable physical quantity, comprising a transmitter including a first rotatable element driven at constant speed in one direction only, a second rotatable element rotated to various positions in accordance with the variations in the physical quantity, means for rotating said first rotatable element at constant speed, a remote receiver electrically connected to said transmitter and including a marking device adapted to travel over a recording surface in one direction only, means for moving said marking device over said recording surface at constant speed, means for periodically stopping said marking device and the first rotatable element of the transmitter, means for actuating said stopping means to non-stopping position to simultaneously release said marking device and first rotatable element, whereby said marking device and said first rotatable element move simultaneously at constant speed and in synchronism with each other from their stopped positions, and means controlled by the first and second rotatable elements of the transmitter for actuating said marking device when said first rotatable element has moved from its stopped position a distance proportional to the value of the physical quantity as determined by the then position of the second rotatable element of the transmitter, whereby a record is produced on said recording surface representative of the values of said physical quantity, and means controlled by said stopping means for also actuating said marking device to produce two other records spaced apart a distance proportional to the total range of values of said physical quantity and serving as base lines between which the first-mentioned record is made and against which said first-mentioned record is measured.

RALPH R. CHAPPELL.
RUTGER B. COLT.
ROBERT J. STREB.